United States Patent [19]

Maloney

[11] Patent Number: 5,260,719

[45] Date of Patent: Nov. 9, 1993

[54] LAMINAR ELECTROOPTIC ASSEMBLY FOR MODULATOR AND PRINTER

[75] Inventor: William T. Maloney, Sudbury, Mass.

[73] Assignee: Polaroid Corporation, Cambridge, Mass.

[21] Appl. No.: 824,946

[22] Filed: Jan. 24, 1992

[51] Int. Cl.⁵ .............................................. G01D 9/42
[52] U.S. Cl. ................................ 346/107 R; 359/245; 359/254; 359/320
[58] Field of Search .......................... 346/160, 107 R; 359/245, 254, 320

[56] References Cited

U.S. PATENT DOCUMENTS

| | | | |
|---|---|---|---|
| 4,327,971 | 5/1982 | Kondo et al. | 350/388 |
| 4,415,915 | 11/1983 | Sprague et al. | 346/160 |
| 4,458,989 | 7/1984 | Tschang | 350/356 |
| 4,636,039 | 1/1987 | Turner | 346/160 X |
| 4,739,374 | 4/1988 | Meed et al. | 355/67 |
| 4,753,517 | 6/1988 | Samek | 350/392 |
| 4,822,148 | 4/1989 | Agostinelli et al. | 350/356 |
| 4,826,298 | 5/1989 | Lynch | 350/403 |
| 4,899,223 | 2/1990 | Springer et al. | 346/107 R X |
| 4,902,111 | 2/1990 | Matsubara et al. | 350/393 |
| 5,005,952 | 4/1991 | Clark et al. | 350/335 |

Primary Examiner—Benjamin R. Fuller
Assistant Examiner—Randy W. Gibson
Attorney, Agent, or Firm—Edward S. Roman

[57] ABSTRACT

An electrooptic assembly for a light modulator, suitable for use in a printer, is constructed as a sequence of film-type layers of electrooptic material, particularly PLZT, supported upon a transparent substrate and having comb-electrode structures disposed as electrode layers at all of the interfaces between the layers of electrooptic material. The electrooptic layers and the electrode layers are readily fabricated by photolithography. A polarizer and an analyzer with crossed polarization axes are disposed on opposite sides of the electrooptic assembly along an optical path to provide, with the electrooptic assembly, an electrooptic modulator. Light passes via the optical path through the modulator upon energization of electrodes with an electric field transverse to a common direction of the electrodes. For use of the light modulator in a printer, a print-medium transport is provided to impart relative motion between the print medium and the optical path, the motion being in a direction perpendicular to a longitudinal dimension of comb electrode structures in the various electrode layers.

10 Claims, 3 Drawing Sheets

LAMINAR ELECTROOPTIC ASSEMBLY FOR MODULATOR AND PRINTER

BACKGROUND OF THE INVENTION

This invention relates to electrooptic modulation of a light beam to produce a line array of data suitable for imprinting pixels of an image on a print medium. More particularly, the invention provides a laminar assembly of comb electrode layers interleaved among layers of electrooptic film material wherein reduced interelectrode spacing lowers required voltage, and multiple arrays of electrodes produce an adequately long optical interaction region along an optical path.

Electrooptic modulators have been employed for modulating beams of light. One form of modulator of considerable interest employs a line array of electrodes in the form of a comb electrode structure wherein sequential ones of the electrodes are provided with voltages from a suitable source of signal voltages to induce corresponding electric fields within the electrooptic material. A beam of light, incident upon the electrooptic material passes first through a polarizer which orients the electric vector of the incident light in a direction inclined at 45 degrees relative to the direction of the comb electrodes. In the construction of the modulator, the electrodes are spaced apart sufficiently to provide for a fringing field which extends in a plane transverse to the electrodes, the plane containing an optical path along which the light propagates. The term "light", as used herein, includes not only the visible portion of the spectrum, but includes also infrared and ultraviolet portions of the spectrum in those situations wherein the polarizing material and the electrooptic material is responsive to these portions of the electromagnetic spectrum.

Light propagating through a region of the electrooptic material activated by the electric field experiences a change of polarization which develops in the following manner. The initially polarized wave can be regarded as having a component of electric field oriented perpendicularly to the electrodes, and a second component of electric field which is oriented parallel to the electrodes. In the absence of the applied electric field, both components of the incident optical signal propagate with the same speed of propagation along the optical path through the electrooptic material. However, in the presence of the applied electric field in the plane transverse to the electrodes, the component of the optical signal having its electric field in the transverse direction experiences a reduction in propagation speed relative to the portion of the optical signal having its electric field parallel to the electrodes. As the two components of the optical signal propagate through the interaction region, the differences in speeds of propagation introduce a continually increasing phase shift between the two optical components.

The amount of phase shift experienced depends on the length of the interaction region, the wavelength of the light in the material, and upon the strength of the applied electric field up to a maximum value wherein the electrooptic effect saturates. The length of the interaction region and the magnitude of the applied electric field may be selected to produce a relative phase shift of 180 degrees between the two components of the optical signal in propagation through the interaction region. The result is a polarization of resultant optical signal which is perpendicular to that of the incident polarization. A second polarizing unit, or analyzer, is positioned at the output side of the electrooptic material, and is oriented at 90 degrees relative to that of the input polarization. Thereby, the outputted signal propagates through the analyzer in the presence of the applied transverse electric field to the electrodes. In the absence of the applied electric field, the exiting optical signal has a polarization perpendicular to that of the analyzer, and is blocked by the analyzer. Alternatively, it will be well understood that the analyzer may be parallel to the polarizer in which case the modulator will be light transmissive "open" when unexcited and light blocking "closed" when excited.

It has been found useful to construct light modulation devices with electrooptic modulators of the foregoing form. By activating successive pairs or groups of electrodes to establish a presence or absence of electric field independently for each of the pairs or groups of electrodes, it is possible to establish a line array of pixels wherein individual ones of the pixels are characterized by the presence or absence of light exiting the modulator.

A problem arises in the use of the foregoing arrangement of electrodes for directing the exiting light of the modulator upon a print medium, so that print markings appear on the print medium in response to the presence and absence of light of the various pixels which are to be printed. The effective length of the interaction region is related directly to the spacing between the electrodes. This is apparent from the geometry of the fringing electric field. In the case of a comb electric structure disposed directly upon the surface of a block of electrooptic material, the useful portion of the fringing field extends into the electrooptic material a distance approximately equal to the interelectrode spacing. In order to ensure an adequate strength of electric field throughout the interaction region, the electrodes must have a correspondingly large signal voltage of hundreds of volts. Such large voltage is inconvenient to generate by signal generators, requires specialized circuitry, and may cause electrical breakdown between electrodes. A further disadvantage is the relatively large size of the electrode array, particularly with respect to the size of pixels which are to be developed on a print medium.

SUMMARY OF THE INVENTION

The aforementioned problems are overcome and other advantages are provided by an electrooptic assembly for a light modulator suitable for use in a printer wherein, in accordance with the invention, the electrooptic assembly is constructed of a set of film-type layers of electrooptic material disposed on a transparent substrate, and wherein multiple electrode layers are included in the assembly with one electrode layer being disposed at each interface between adjacent electrooptic layers. In this way, an optical interaction region in the electrooptic material is provided with a desired length by a sequence of electrode structures disposed along a light propagation path. Thus, each electrode array need provide only a relatively small fraction of the applied electric fringing field for the interaction region. With closely spaced electrode layers, the electric field lines are substantially parallel, similar to the field of a parallel plate capacitor. Accordingly, the spacing between sequential electrodes in each electrode layer can be made much smaller than has been possible heretofore. Also, there can be a corresponding reduction in applied voltage between sequential electrodes in each electrode layer. In each layer, the electrode structure is a comb structure wherein, in a preferred embodiment of the invention, alternate electrodes are grounded and the intermediate electrodes operate at signal voltage. Thereby, both physical size of each comb electrode structure and the applied voltage are reduced to provide important benefits, both in terms of electrical drive circuitry and in terms of providing high-resolution small-pixel imprinting on a print medium.

In each of the comb electrode structures, the electrodes are parallel to each other. Also, the electrodes of one layer are parallel to the electrodes of the comb structures of other ones of the layers. Both the film-type layers of electrooptic material and the electrode structures are readily fabricated by photolithography. This mode of construction removes restrictions on the thickness of the various electrooptic layers because, even if a layer need be made thin for dimensional stability, one need only add additional layers of electrodes to obtain the desired amount of electrooptic material for a sufficiently long interaction region. This provides convenience of assembly and accuracy in the locating of the electrodes. A suitable electrooptic material is hot-pressed lanthanum lead zirconate-titanate (PLZT). The substrate may be fabricated of sapphire, fused silica or Pyrex glass. Construction of the light modulator further comprises a polarizer and an analyzer with the electrooptic assembly disposed therebetween. A suitable signal generator is applied to all of the electrodes of all of the electrode layers for energizing the electrodes with image data which may be obtained in real time from a scanner of an image or from data which has been stored previously in a memory. For use of the modulator in a printer, apparatus is provided for producing relative motion between a print medium and the light-propagation path, the motion being, for example, in a direction parallel to the direction of the electrodes and perpendicular to the long dimension of each comb electrode structure.

Upon application of light from a suitable source of light which may include a collimating lens for providing parallel rays of the light, the polarizer polarizes the light beam to provide the transverse and parallel components of the optical signal which undergo different speeds of propagation through the electrooptic material upon application of the applied electric field transverse to the electrodes. The resulting light exiting the electrooptic material is polarized in a direction perpendicular to that of the polarizer for those pixels having an applied electric field. Thus, light exiting the electrooptic material is passed or blocked by the analyzer depending on the presence or absence of the applied electric field. Photosensitive material of the print medium reacts to the presence of light to produce markings on the print medium corresponding to the activation of the various pixels. The invention provides an additional manufacturing benefit in that there is no longer a requirement for polishing and lapping surfaces of bulk electrooptic material to provide optically smooth surfaces to the bulk material as had been required by electrooptic light modulators of the prior art.

BRIEF DESCRIPTION OF THE DRAWING

The aforementioned aspects and other features of the invention are explained in the following description, taken in connection with the accompanying drawing wherein.

DETAILED DESCRIPTION

The invention relates to a construction of an electrooptic assembly of multiple comb-electrode layers interleaved among electrooptic film layers. Inclusion of a polarizer and an analyzer disposed on opposite sides of the electrooptic assembly provides a light modulator suitable for printing a line of pixels of an image simultaneously upon a print medium. In the ensuing description, details in the construction of the electrooptic assembly are described with reference to FIGS. 1–4. Description of the completed light modulator in conjunction with printing apparatus is provided with reference to FIG. 5.

Figure 1:
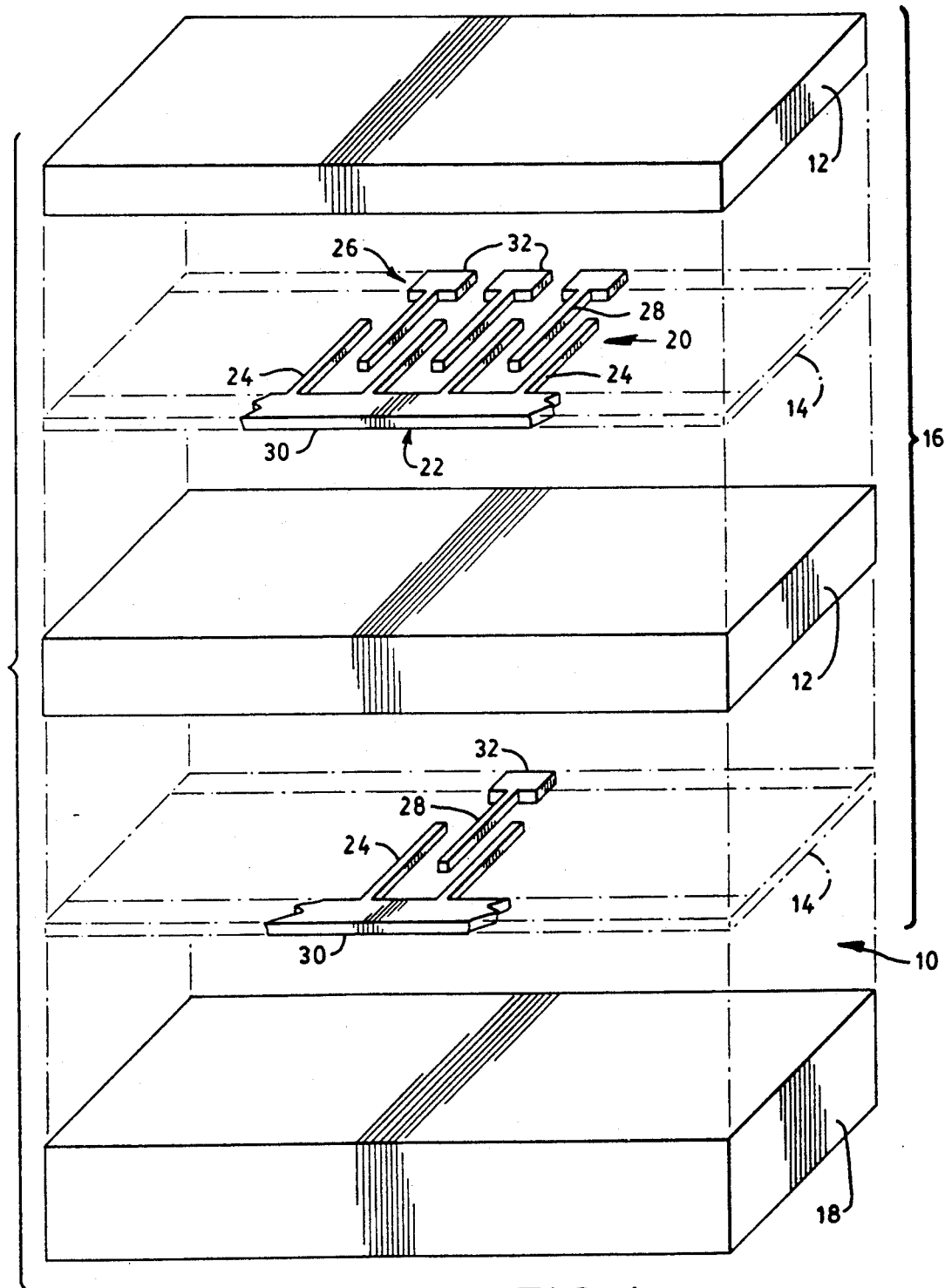
FIG. 1 is an exploded view, partially diagrammatic, of an electrooptic assembly of the invention having layers of electrooptic material and layers of electrodes.
Figure 2:
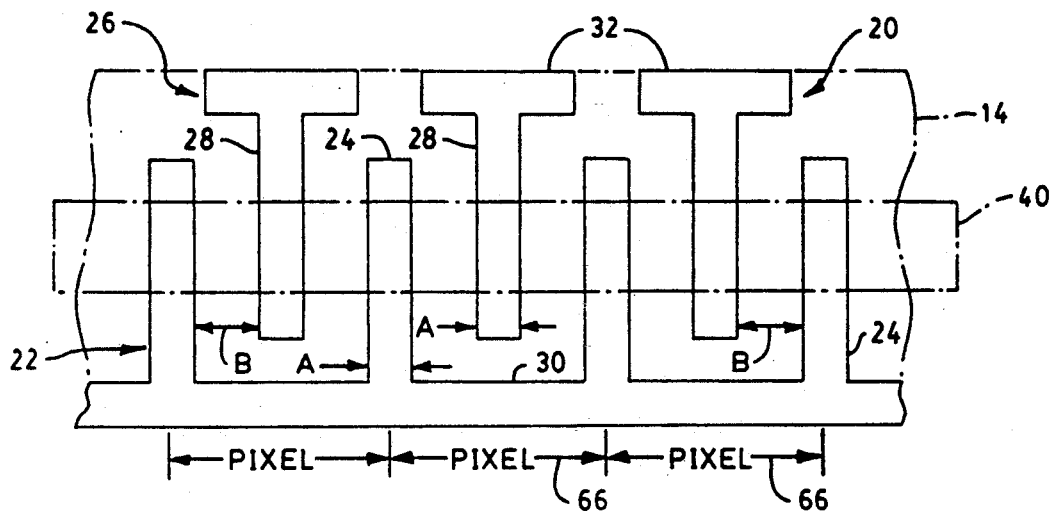
FIG. 2 is a plan view of an electrode array of a layer of FIG. 1.

With reference to FIGS. 1 and 2, a laminar electrooptic assembly 10 comprises multiple electrooptic layers 12 interleaved among multiple electrode layers 14 in the form of a stack 16 supported by a transparent substrate 18. Each of the electrode layers 14 is positioned along an interface between two electrooptic layers 12. Each of the electrode layers 14 comprises a comb electrode structure 20 including a first comb array 22 of electrodes 24 and a second comb array 26 of electrodes 28. In the first comb array 22, the electrodes 24 are joined together electrically by a spine 30 which places all of the electrodes 24 at the same electric potential. The spine 30 also serves as a suitable pad for making electrical contact with an external electrical circuit, to be described hereinafter. In the second comb array 26, each of the electrodes 28 is provided with its own individual pad 32 by which electrical contact is made with the external electrical circuit. The comb electrode structure 20 may be formed of electrically conductive material suitable for deposition by photolithography such as copper, aluminum, tin, gold, indium-tin oxide, or polysilicon.

In accordance with the invention, the electrooptic material of each of the electrooptic layers 12 comprises lanthanum lead zirconate-titanate (PLZT) having a chemical composition given by the following formula:

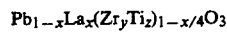

The composition of the PLZT material commonly used for electrooptic modulators has a value of $y=0.65$ and $z=0.35$. In the lanthanum concentration, x varies from 8.5 to 9.5 atomic percent. This composition range affords a reasonably slim hysteresis loop, and a reasonably strong quadratic transverse electrooptic effect. The difference in speeds of propagation of electromagnetic waves in the electrooptic material, for waves having electric fields parallel to and perpendicular to an applied external electric field, is proportional to the square of the magnitude of the applied electric field; hence, the use of the foregoing descriptive term "quadratic".

The PLZT material is a ceramic which, on a microscopic scale, has crystalline properties but, on a macroscopic scale, is more like a mixture. The electrooptic material is initially isotropic, but becomes anisotropic upon excitation with an external electric field. Upon impressing the electric field through the electrooptic material, an electromagnetic wave propagating through the material normal to a plane containing the impressed electric field experiences a difference in speed of propagation such that a component of the wave polarized parallel to the external field is retarded in its propagation relative to a component of the wave which is polarized perpendicular to the external electric field. The individual electrooptic layers 12, as well as the individual electrode layers 14 are built up successively upon the substrate 18 by processes of deposition and photolithography.

Figure 3:
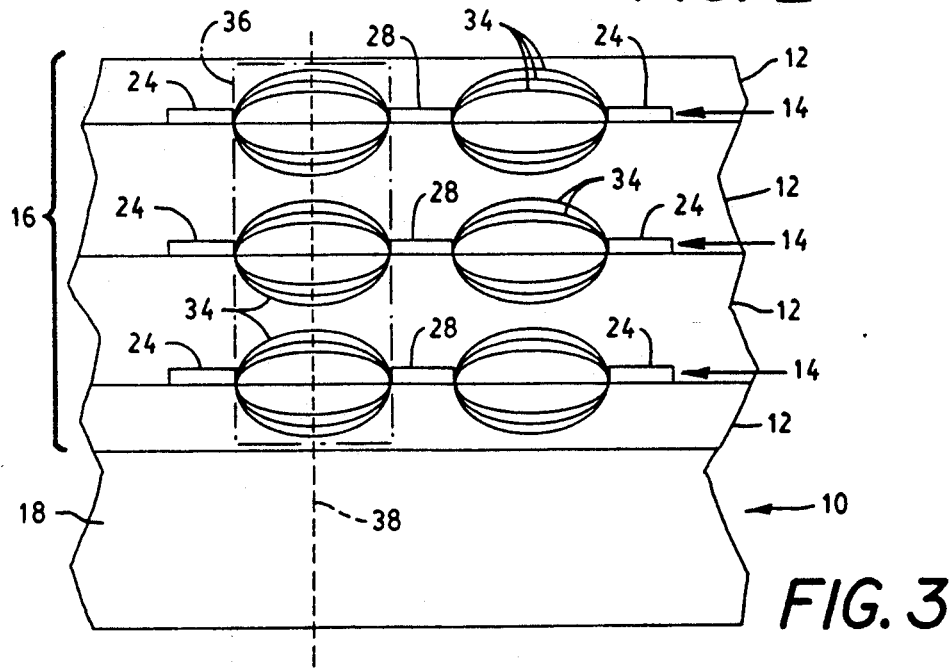
FIGS. 3 and 4 are alternate configurations of the electrooptic assembly of FIG. 1, shown diagrammatically in sectional views.
Figure 4:
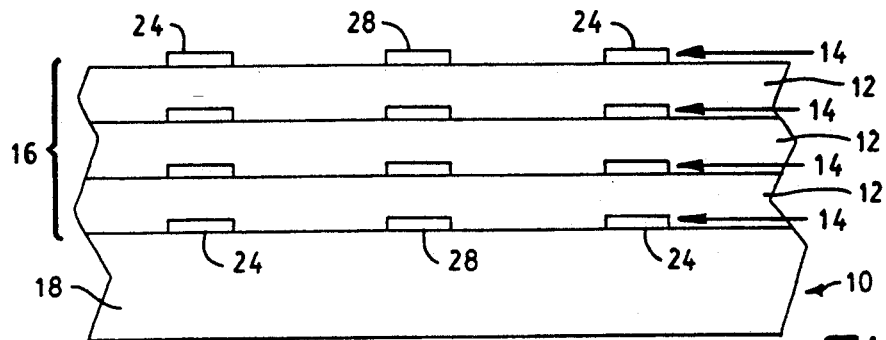

FIGS. 3 and 4 show sectional views of two different arrangements of the layers in the stack 16 of FIG. 1. In FIG. 3, the top layer is an electrooptic layer 12, and the bottom layer which is contiguous to the substrate 18 is an electrooptic layer 12. In FIG. 4, the top layer is an electrode layer 14, and the bottom layer which is contiguous to the substrate 18 is an electrode layer 14. The electrode layers 14 in each of FIGS. 3 and 4 are indicated diagrammatically by three electrodes of which the center electrode is an electrode 28 of the second comb array 26 of FIG. 1, and the two outer electrodes are electrodes 24 of the first comb array 22 of FIG. 1. Upon establishment of a difference of potential between the electrodes 24 and 28, electric fields are developed, the electric fields being indicated vectorially by means of field lines 34 extending between the electrodes 28 and 24 in directions perpendicular to the electrodes 28 and 24. The field lines 34 spread apart with increasing distance from the electrodes 28 and 24 in the manner of a fringing field so as to occupy all of an interaction region 36 surrounding an optical path 38 within the stack 26 of the electrooptic layers 12. As shown in FIGS. 3 and 4, the configuration of the fringing fields along the optical path 38 about an electrode layer 14 produces substantial parallelism among the electric field lines 34 and reduction in length of the field lines 34 upon a reduction in the spacing between successive electrode layers 14, particularly for spacings significantly less than the interelectrode spacing in any one electrode layer 14. Thereby, the voltage applied between electrodes, such as the electrodes 24 and 28 is reduced greatly from that employed in the prior art to achieve the same half-wave transformation of the transmitted light.

FIG. 2 shows electrode dimensions employed in a preferred embodiment of the invention. Each of the electrodes 24 and 28 has a width, indicated as dimension A, of 10 microns. The interelectrode spacing between an electrode 24 and the next electrode 28, indicated as dimension B, is 40 microns. The comb electrode structure 20 has a periodic form. With the foregoing dimensions, the repetition period of the electrode structure 20 is 100 microns. Thus, each pixel extends 100 microns along the longitudinal dimension of the electrode structure 20. The thickness of an electrode 24 or 28 is in the range of approximately 1000-1500 angstroms. A cross-section 40 of a beam of light propagating along the optical path 38 is indicated by a dashed line. The cross section 40 has a longitudinal shape and transects central portions of the electrodes 24 and 28 in each of the electrode layers 14. Within the cross section 40, the fringing electric fields, portrayed by the field lines 34 of FIG. 3, are at their maximum value. Thus, by configuring a beam of light to the shape and location of the cross section 40, maximum advantage is taken of the interaction region 36 for imparting maximum differential propagation speed as a function of applied signal voltage between a pair of electrodes 24 and 28.

In the preparation of each of the electrooptic layers 12, one technique for preparing a layer is to mix the component portions thereof in a solution, drip the solution onto the substrate 18, or other layers such as an electrode layer 14, and then spin the substrate 18 to attain a a spin layer, similar to the process of depositing a photoresist. Thereupon, the deposited material is heated to provide a gel, the gel then being baked at approximately 550 degrees centigrade to obtain a desired solid form of material of an electrooptic layer 12. The electrooptic material may be deposited also by chemical-vapor deposition (CVD). A typical thickness of an electrooptic layer 12 is approximately 10 microns, by way of example, a thickness which can be obtained by repeating the foregoing spin-deposition process. With this thickness, the fringing field at its maximum excursion is only five microns from the electrode layer 14, a distance only one-eighth of the interelectrode spacing of forty microns. This provides for the aforementioned parallelism of the electric field lines 34. In the construction of the electrooptic layers 12 of FIG. 3, the top layer and the bottom layer may be provided with only one-half the thickness (5 microns) of the other layers to accommodate the fringing electric field of only one electrode layer 14, rather than the fringing fields of two electrode layers 14 as is the case with the centrally located electrooptic layers 12.

Figure 5:
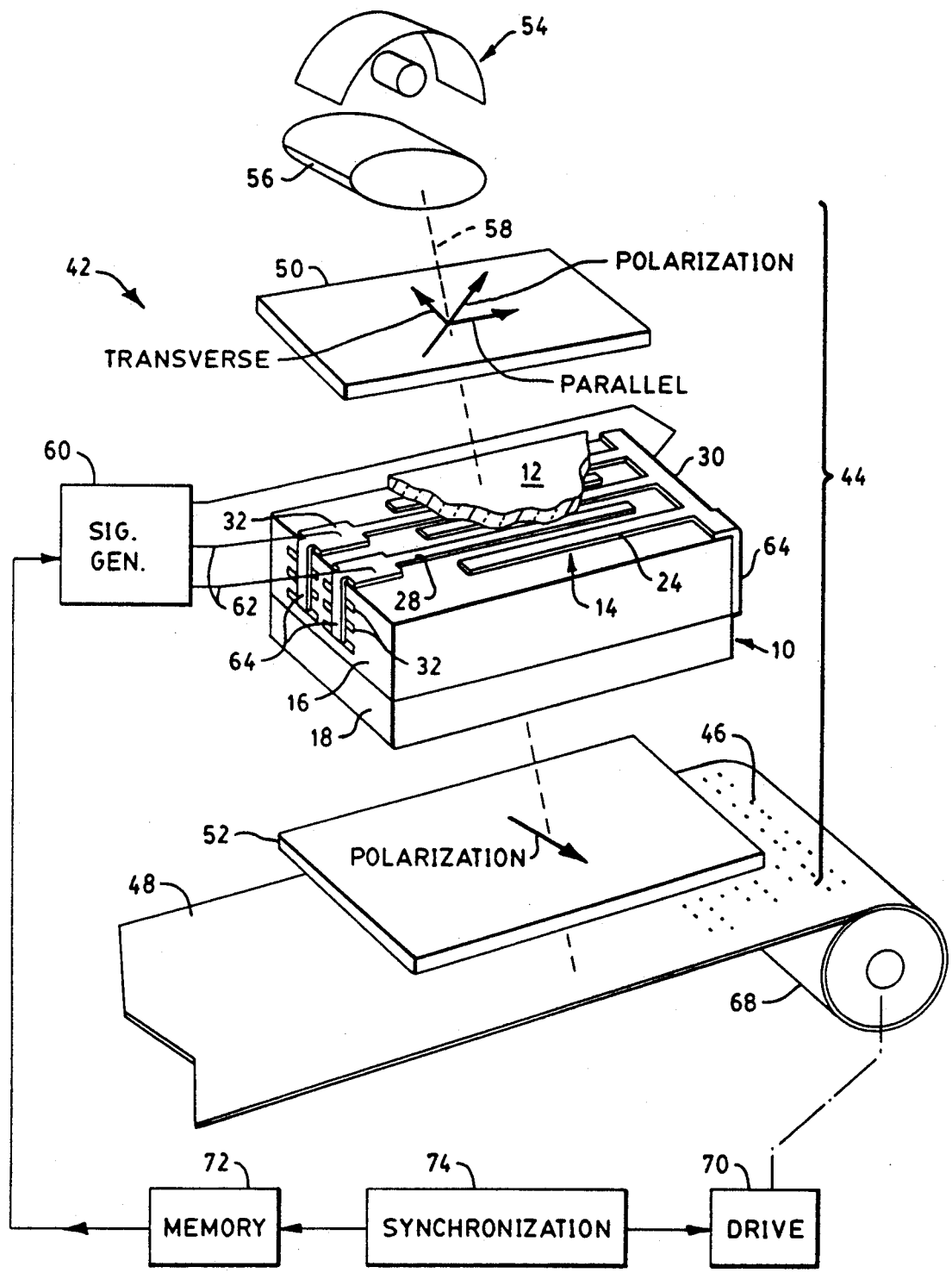
FIG. 5 shows, diagrammatically, a light modulator incorporating the electrooptic assembly of FIG. 1 in combination with printing apparatus for imparting relative motion between a print medium and a light propagation path of the light modulator.

FIG. 5 shows a simplified view of a printer 42 employing an electrooptic light modulator 44 for imprinting markings 46 on a print medium 48. The light modulator 44 includes the electrooptic assembly 10 (FIG. 1) plus a polarizer 50 and an analyzer 52 disposed respectively along a front side and a back side of the assembly 10. A light source 54 includes a collimator 56, which may be a barrel-shaped lens, and a suitable aperture (not shown) for forming a beam 58 of light having the cross-section 40 (FIG. 2). The beam 58 propagates along the optical path 38 towards the print medium 48. A signal generator 60 is connected via a set of electrical leads 62 to the pads 32 of the second comb array 26 (FIG. 1) and the spine 30 of the first comb array 22 in each of the electrode layers 14 for applying signal voltage between various ones of the electrodes 24 and 28 in each electrode layer 14. The electrode structures 20 of the respective electrode layers 14 are connected electrically in parallel to the signal generator 60. The parallel connection is facilitated by the introduction of electrically-conductive straps 64 which are emplaced along the outer surface of the stack 16. Thus, straps 64 interconnect corresponding ones of the pads 32, and also interconnect the spines 30. In lieu of the straps 64, if desired, connecting rods (not shown) may be constructed through the electrooptic layers 12 to make connection between the corresponding pads 32 and the spines 30.

As shown in each pixel region 66 of FIG. 2, there is one pad 32 with its electrode 28 associated with each pixel region 66. Thus, to print a marking 46 for a specific pixel, the signal generator 60 need apply a voltage to the pad 32 for the designated pixel region 66 of an electrode layer 14. In view of the parallel connections of the pads 32 and the spines 30, the application of the voltage to one pad 32 provides for the voltage to the corresponding pads 32 of all of the electrode layers 14. The voltage is applied between the designated pad 32 and the spine 30 which is maintained at ground potential. Thereby, the signal generator 60 can activate a plurality of designated pixels for printing a line of pixels simultaneously upon the print medium 48.

In the operation of the electrooptic light modulator 44, the collimated beam 58 of light is polarized by the polarizer 50 such that the electric field of the light beam is angled 45 degrees to one side of the direction of the electrodes of the layers 14. The analyzer 52 has its direction of polarization oriented 45 degrees to the opposite side of the direction of the electrodes of the layers 14. Light propagating from the polarizer 50 to the electrooptic assembly 10 has an electric field component perpendicular to the electrodes of the layers 14 and a second component parallel to these electrodes. The transverse and the parallel components of the polarization are shown by vectors in FIG. 5. In those pixels which have been activated electrically by the signal generator 60, by application of signal voltages to the electrodes 28 of the selected pixels, a differential propagation speed results between the perpendicular and the parallel components of the polarized light beam. This results, at the back side of the electrooptic assembly 10, in a shift in polarization of 90 degrees to line up with the polarization of the analyzer 52. Thereby, in response to electrical activation of a pixel region 66 in the electrooptic assembly 10 by the signal generator 60, the corresponding pixel region is printed in the print medium 48 in the form of a marking 46. Other pixels along a print line of the print medium 48 wherein the corresponding pixel regions 66 of the assembly 10 have not been electrically activated by the signal generator 60 remain blank.

In order to print a succession of lines of an image upon the print medium 48, means such as a roller 68 are provided for introducing a relative motion between the print medium 48 and the optical path 38. Alternatively, means (not shown) may be provided for moving a scanning head comprising the modulator 44 and the light source 54 relative to the print medium 48 which, in such case, would remain stationary. In the embodiment shown in FIG. 5, the print medium 48 is drawn by the roller 68 during rotation of the roller 68 by a motorized drive unit 70. Specific pixels in each print line which are to be activated by the signal generator 60 are stored as image data in a memory 72, and are read out of the memory 72 to the generator 60 in response to timing signals of a synchronizer 74. The synchronizer 74 also applies timing signals to the drive unit 70 for inducing rotary motion of the roller 68 in synchronism with transfer of data from the memory 72 to the generator 60. Thereby, the position of the print medium 48 is advanced a desired amount between each imprinting of a line of image data on the medium 48 by operation of the modulator 44.

It will be understood that the polarizer 50 is required only when the light source is unpolarized; however, the source illumination may be a polarized laser in which case the polarizer 50 can be eliminated.

It is to be understood that the above described embodiment of the invention is illustrative only, and that other modifications thereof may occur to those skilled in the art. Accordingly, this invention is not to be regarded as limited to the embodiment disclosed herein, but is to be limited only as defined by the appended claims.

What is claimed is:

1. An electrooptic assembly for a light modulator, the assembly comprising:
   a transparent substrate;
   plural electrooptic layers of electrooptic material, the material being characterized by an optical speed of propagation dependent on a magnitude of an electric field applied to the material; and
   plural electrode layers, interleaved with the electrooptic layers and supported by the substrate, each electrode layer having a comb electrode structure comprising a plurality of spaced apart electrodes, each adjacent pair of said electrodes can be selectively energized to effect a select electric field therebetween.

2. An assembly according to claim 1 wherein the electrodes of said comb electrode structure are substantially parallel to each other and to corresponding electrodes of the comb electrode structure of other electrode layers.

3. An assembly according to claim 2 wherein said electrooptic material comprises PLZT.

4. A light modulator comprising:
   an electrooptic assembly including a transparent substrate, plural electrooptic layers of electrooptic material and plural electrode layers, interleaved with the electrooptic layers and supported by the substrate, each electrode layer having a comb electrode structure comprising a plurality of spaced apart electrodes, each adjacent pair of said electrodes can be selectively energized to effect a select electric field therebetween;
   means for providing a source of polarized light; and
   an analyzer having an optical axis angled relative to the polarized light and to the electrodes of said electrode layers, the means for providing a source of polarized light and the analyzer being disposed on opposite sides of said electrooptic assembly along an optical path for propagation of light; wherein the electrodes of said electrode layers are parallel to each other and, upon an establishment of select electric fields between adjacent electrodes of said electrode layers and upon direction of said polarized light along said optical path, an intensity of light along said optical path is varied by the light modulator.

5. The light modulator according to claim 4 wherein the electrodes of said comb electrode structure are substantially parallel to each other and to corresponding electrodes of the comb electrode structure of other electrode layers.

6. An assembly according to claim 5 wherein said electrooptic material comprises PLZT.

7. A printer comprising:
   an electrooptic assembly including a transparent substrate, plural electrooptic layers of electrooptic material and plural electrode layers, interleaved with the electrooptic layers and supported by the substrate; each electrode layer having a comb electrode structure comprising a plurality of spaced apart electrodes, each adjacent pair of said electrodes can be selectively energized to effect a select electric field therebetween;
   means for providing a source of polarized light;
   an analyzer having optical axes angled relative to the polarized light and to the electrodes of said electrode layers, the means for providing the polarized light and the analyzer being disposed on opposite sides of said electrooptic assembly along an optical path for propagation of light from the means for providing the polarized light to provide, with said electroptic assembly, a light modulator, wherein the electrodes of said electrode layers are parallel to each other and, upon an establishment of select electric fields between adjacent electrodes of said electrode layers and upon direction of light from the means for providing the polarized light along said optical path, an intensity of light along said optical path is varied, by the light modulator;

signal means connected to select electrodes of said electrode layers for generating the electric fields within said electrooptic material; and means for supporting a print medium transverse to said optical path where the electrodes in each of said layers extend parallel to each other and transversely of said optical path to establish a print line upon said print medium, said print medium producing a line of print markings in response to light from the means for providing the polarized light being transmitted though said light modulator to said print medium.

8. The printer according to claim 7 further comprising means for introducing relative motion between said optical path and said print medium, said relative motion being transverse to said print line.

9. The printer according to claim 7 wherein the electrodes of said comb electrode structure are substantially parallel to each other and to corresponding electrodes of the comb electrode structure of other electrode layers.

10. The printer according to claim 8 wherein said electrooptic material comprises PLZT.

* * * * *